(12) United States Patent
McClean et al.

(10) Patent No.: US 12,723,946 B2
(45) Date of Patent: Sep. 1, 2026

(54) CIRCULATOR CABLE FOR USE WITH A PLUGGABLE OPTICAL TIME DOMAIN REFLECTOMETER

(71) Applicant: II-VI Delaware, Inc., Wilmington, DE (US)

(72) Inventors: Ian Peter McClean, Brixham (GB); Sigfried Fleischer, Los Gatos, CA (US); Vincent Ouyang, Fuzhou (CN)

(73) Assignee: II-VI Delaware, Inc., Wilmington, DE (US)

( * ) Notice: Subject to any disclaimer, the term of this patent is extended or adjusted under 35 U.S.C. 154(b) by 522 days.

(21) Appl. No.: 18/202,479

(22) Filed: May 26, 2023

(65) Prior Publication Data

US 2024/0385079 A1 Nov. 21, 2024

(30) Foreign Application Priority Data

May 18, 2023 (CN) ......................... 202310564806.2

(51) Int. Cl.
*H04B 10/071* (2013.01)
*G01M 11/00* (2006.01)

(52) U.S. Cl.
CPC ............................... *G01M 11/3154* (2013.01)

(58) Field of Classification Search
CPC .................................................... H04B 10/071
See application file for complete search history.

(56) References Cited

U.S. PATENT DOCUMENTS 6,407,861 B1 * 6/2002 Zhang .................. G02B 5/3083 359/489.08
2016/0178859 A1 * 6/2016 Thompson ........... G02B 6/3825 385/56
2020/0073059 A1 * 3/2020 Takeuchi ............. G02B 6/3846

OTHER PUBLICATIONS

Chen et al., "Reduction of the Impairment of Online OTDR Monitoring by Use of a Narrow Bandwidth OTDR and an Optical Bandpass Filter", IEEE Photonics Technology Letters, vol. 16, No. 9, Sep. 2004 (Year: 2004).*
"3 Ports Polarization Insensitive Optical Circulator", fs.com, 2022 (Year: 2022).*

* cited by examiner

*Primary Examiner* — Shi K Li
(74) *Attorney, Agent, or Firm* — McAndrews, Held & Mallloy, Ltd.

(57) ABSTRACT

A circulator cable configured to couple an optical time domain reflectometer (OTDR) to an optical fiber span under test is provided. The circulator cable includes a bandpass optical filter configured to be coupled to an optical input port of the OTDR; and a directional optical coupling device coupled to the bandpass optical filter and an optical output port of the OTDR and configured to direct propagation of an optical probe signal generated by the OTDR from the optical output port toward the optical fiber span under test and direct reflections attributed to the optical probe signal from the optical fiber span under test into the bandpass pass optical filter.

18 Claims, 14 Drawing Sheets

200
202
Processor
204
Memory
206
Storage Component
208
Input Component
210
Output Component
212
Communication Interface
214

432
422, 426
438
428
430

434
436
444
432
442
440
428
430

CIRCULATOR CABLE FOR USE WITH A PLUGGABLE OPTICAL TIME DOMAIN REFLECTOMETER

CROSS-REFERENCE TO RELATED APPLICATION

This application claims priority to Chinese Patent Application No. 202310564806.2 filed May 18, 2023, the disclosure of which is hereby incorporate by reference in its entirety.

BACKGROUND

1. Field

This disclosed subject matter relates generally to fiber-optic communication and, in some non-limiting embodiments, to various physical configurations of a circulator cable configured to link a pluggable optical time domain reflectometer (OTDR) to a cable span.

2. Description of Related Art

OTDRs are used extensively to determine optical fiber characteristics such as attenuation, reflections, and the like, in order to optimize the working levels of associated transmitter and receiver devices in an optical communications network. An OTDR module typically includes an optical source used to generate a probe lightwave that is coupled into an optical fiber span being analyzed, and an optical receiver for detecting reflected light attributed to the probe lightwave that re-enters the OTDR from the fiber span under evaluation. An associated processing module utilizes information associated with the probe lightwave (e.g., in the case of using probe pulses, the timing information associated with the pulse train) and the optical power in the return back-reflected light to create an output (typically referred to as an OTDR trace) that defines the overall loss along the fiber span, as well as an identification of any physical changes/reflection points (e.g., connectors, splices, and the like) that may be present along the measured span.

FIG. 1 is a diagram of a conventional OTDR 10 that may be used to monitor properties of an optical fiber span 20 of a fiber-optic communication system. OTDR 10 includes an optical transmitter 12 for providing an optical probe lightwave that is coupled into fiber span 20 and used in a manner well-understood in the art to create back-reflected light in the return direction, where the reflected light is used to generate an OTDR trace as the output from OTDR 10. In many cases, the optical probe signal takes the form of an optical pulse train, but other types of optical probe signals (e.g., continuous-wave signal, a digital signal having a particular coding scheme, etc.) may be used as well.

An optical receiver 14 (in this case taking the form of a bandpass optical filter 14*a* followed by a photodetector 14*b*) is also located in OTDR 10 and is used to measure the back-reflected light created by the optical probe as it propagates along the fiber span 20. In this particular configuration, an optical circulator 16 is used to control/direct the signal flows between optical transmitter 12, optical receiver 14, and fiber span 20.

OTDR 10 also includes electronic elements used to control the operation of transmitter 12 and receiver 14, as well as process the return light from receiver 14 to develop the OTDR trace output. In particular, a driver circuit 30 is used to energize the light source (laser) within the transmitter 12, and may be configured to provide a pulsed electronic input to the light source. A transimpedance amplifier (TIA) 32 is shown as coupled to the output from photodetector 14*b* and is used to convert the electrical current from photodetector 14*b* into a voltage waveform useful in further processing. A processor 34 is used to control operation of laser driver 30 and also analyze the return electrical signals from TIA 32 used to create the OTDR trace. An electrical interface 36 provides bidirectional communication between OTDR 10 and remote monitoring equipment.

The OTDR 10 is fully integrated, with all components assembled within a single assembly 40. A single output port 42 from the assembly 40 provides the optical connection between OTDR 10 and a wavelength division multiplexer (WDM) 22 positioned along the fiber span 20 of an optical communication network. While integration of components is typically a desirable mechanism to achieve improved product designs, in this case the integration reduces the flexibility of the OTDR functionality and results in a product that cannot easily be provided as a pluggable, small form factor component.

In order to achieve an OTDR having such a pluggable, small form factor, a need exists for circulator cable configured to link such an OTDR into a fiber span.

SUMMARY

Accordingly, it is an object of the presently disclosed subject matter to provide systems that overcome some or all of the deficiencies of the prior art.

According to non-limiting embodiments, provided is a circulator cable configured to couple an optical time domain reflectometer (OTDR) to an optical fiber span under test. The circulator cable comprises: a bandpass optical filter configured to be coupled to an optical input port of the OTDR; and a directional optical coupling device coupled to the bandpass optical filter and an optical output port of the OTDR and configured to direct propagation of an optical probe signal generated by the OTDR from the optical output port toward the optical fiber span under test and direct reflections attributed to the optical probe signal from the optical fiber span under test into the bandpass pass optical filter.

The directional optical coupling device may comprise an optical circulator. The optical circulator may comprise at least one Faraday rotator. For example, the optical circulator may comprise a first Faraday rotator, a second Faraday rotator, and a polarizer positioned between the first Faraday rotator and the second Faraday rotator.

The bandpass optical filter may be a 1625 nm narrowband optical filter. In some examples, the circulator cable may further comprise a wavelength division multiplexer for coupling optical signals between the directional optical coupling device and the optical fiber span under test. The bandpass optical filter and the directional optical coupling may be fitted into a ruggedized cable. The circulator cable may be connected to the optical input port and the optical output port of the OTDR by angled physical connectors (APCs).

According to another non-limiting embodiment, provided is a circulator cable configured to couple an optical time domain reflectometer (OTDR) to an optical fiber span under test. The circulator cable comprising: a wavelength division multiplexer coupled to the optical fiber span under test; and a directional optical coupling device coupled to an optical output port of the OTDR and configured to direct propagation of an optical probe signal generated by the OTDR from the optical output port toward the wavelength division multiplexer and the optical fiber span under test and direct reflections attributed to the optical probe signal from the optical fiber span under test into an optical input port of the OTDR.

The directional optical coupling device may comprise an optical circulator. The optical circulator may comprise at least one Faraday rotator. For example, the optical circulator may comprise a first Faraday rotator, a second Faraday rotator, and a polarizer positioned between the first Faraday rotator and the second Faraday rotator.

The circulator cable may further comprise a bandpass optical filter configured to be coupled between the directional optical coupling device and the optical input port of the OTDR. The bandpass optical filter may be a 1625 nm narrow-band optical filter.

The wavelength division multiplexer and the directional optical coupling may be fitted into a ruggedized cable. The circulator cable may be connected to the optical input port and the optical output port of the OTDR by angled physical connectors (APCs).

According to another non-limiting embodiment, provided is a circulator cable configured to couple an optical time domain reflectometer (OTDR) to an optical fiber span under test. The circulator cable comprises: a bandpass optical filter configured to be coupled to an optical input port of the OTDR; a wavelength division multiplexer coupled to the optical fiber span under test; and a directional optical coupling device coupled to the bandpass optical filter and an optical output port of the OTDR and configured to direct propagation of an optical probe signal generated by the OTDR from the optical output port toward the wavelength division multiplexer and the optical fiber span under test and direct reflections attributed to the optical probe signal from the optical fiber span under test into the bandpass pass optical filter.

The directional optical coupling device may comprise an optical circulator. The bandpass optical filter, the wavelength division multiplexer, and the directional optical coupling may be fitted into a ruggedized cable. The circulator cable may be connected to the optical input port and the optical output port of the OTDR by angled physical connectors (APCs).

Further embodiments are set forth in the following numbered clauses:

Clause 1: A circulator cable configured to couple an optical time domain reflectometer (OTDR) to an optical fiber span under test, the circulator cable comprising: a bandpass optical filter configured to be coupled to an optical input port of the OTDR; and a directional optical coupling device coupled to the bandpass optical filter and an optical output port of the OTDR and configured to direct propagation of an optical probe signal generated by the OTDR from the optical output port toward the optical fiber span under test and direct reflections attributed to the optical probe signal from the optical fiber span under test into the bandpass pass optical filter.

Clause 2: The circulator cable of clause 1, wherein the directional optical coupling device comprises an optical circulator.

Clause 3: The circulator cable of clause 2, wherein the optical circulator comprises at least one Faraday rotator.

Clause 4: The circulator cable of clause 2 or clause 3, wherein the optical circulator comprises a first Faraday rotator, a second Faraday rotator, and a polarizer positioned between the first Faraday rotator and the second Faraday rotator.

Clause 5: The circulator cable of any of clauses 1-4, wherein the bandpass optical filter is a 1625 nm narrow-band optical filter.

Clause 6: The circulator cable of any of clauses 1-5, wherein the circulator cable further comprises a wavelength division multiplexer for coupling optical signals between the directional optical coupling device and the optical fiber span under test.

Clause 7: The circulator cable of any of clauses 1-6, wherein the bandpass optical filter and the directional optical coupling are fitted into a ruggedized cable.

Clause 8: The circulator cable of clauses 1-7, wherein the circulator cable is connected to the optical input port and the optical output port of the OTDR by angled physical connectors (APCs).

Clause 9: A circulator cable configured to couple an optical time domain reflectometer (OTDR) to an optical fiber span under test, the circulator cable comprising: a wavelength division multiplexer coupled to the optical fiber span under test; and a directional optical coupling device coupled to an optical output port of the OTDR and configured to direct propagation of an optical probe signal generated by the OTDR from the optical output port toward the wavelength division multiplexer and the optical fiber span under test and direct reflections attributed to the optical probe signal from the optical fiber span under test into an optical input port of the OTDR.

Clause 10: The circulator cable of clause 9, wherein the directional optical coupling device comprises an optical circulator.

Clause 11: The circulator cable of clause 10, wherein the optical circulator comprises at least one Faraday rotator.

Clause 12: The circulator cable of clauses 9 or 10, wherein the optical circulator comprises a first Faraday rotator, a second Faraday rotator, and a polarizer positioned between the first Faraday rotator and the second Faraday rotator.

Clause 13: The circulator cable of any of clauses 9-12 further comprising a bandpass optical filter configured to be coupled between the directional optical coupling device and the optical input port of the OTDR.

Clause 14: The circulator cable of any of clauses 9-13, wherein the bandpass optical filter is a 1625 nm narrow-band optical filter.

Clause 15: The circulator cable of any of clauses 9-14, wherein the wavelength division multiplexer and the directional optical coupling are fitted into a ruggedized cable.

Clause 16: The circulator cable of any of clauses 9-15, wherein the circulator cable is connected to the optical input port and the optical output port of the OTDR by angled physical connectors (APCs).

Clause 17: A circulator cable configured to couple an optical time domain reflectometer (OTDR) to an optical fiber span under test, the circulator cable comprising: a bandpass optical filter configured to be coupled to an optical input port of the OTDR; a wavelength division multiplexer coupled to the optical fiber span under test; and a directional optical coupling device coupled to the bandpass optical filter and an optical output port of the OTDR and configured to direct propagation of an optical probe signal generated by the OTDR from the optical output port toward the wavelength division multiplexer and the optical fiber span under test and direct reflections attributed to the optical probe signal from the optical fiber span under test into the bandpass pass optical filter.

Clause 18: The circulator cable of clause 17, wherein the directional optical coupling device comprises an optical circulator.

Clause 19: The circulator cable of clause 17 or clause 18, wherein the bandpass optical filter, the wavelength division multiplexer, and the directional optical coupling are fitted into a ruggedized cable.

Clause 20: The circulator cable of any of clauses 17-19, wherein the circulator cable is connected to the optical input port and the optical output port of the OTDR by angled physical connectors (APCs).

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular forms of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
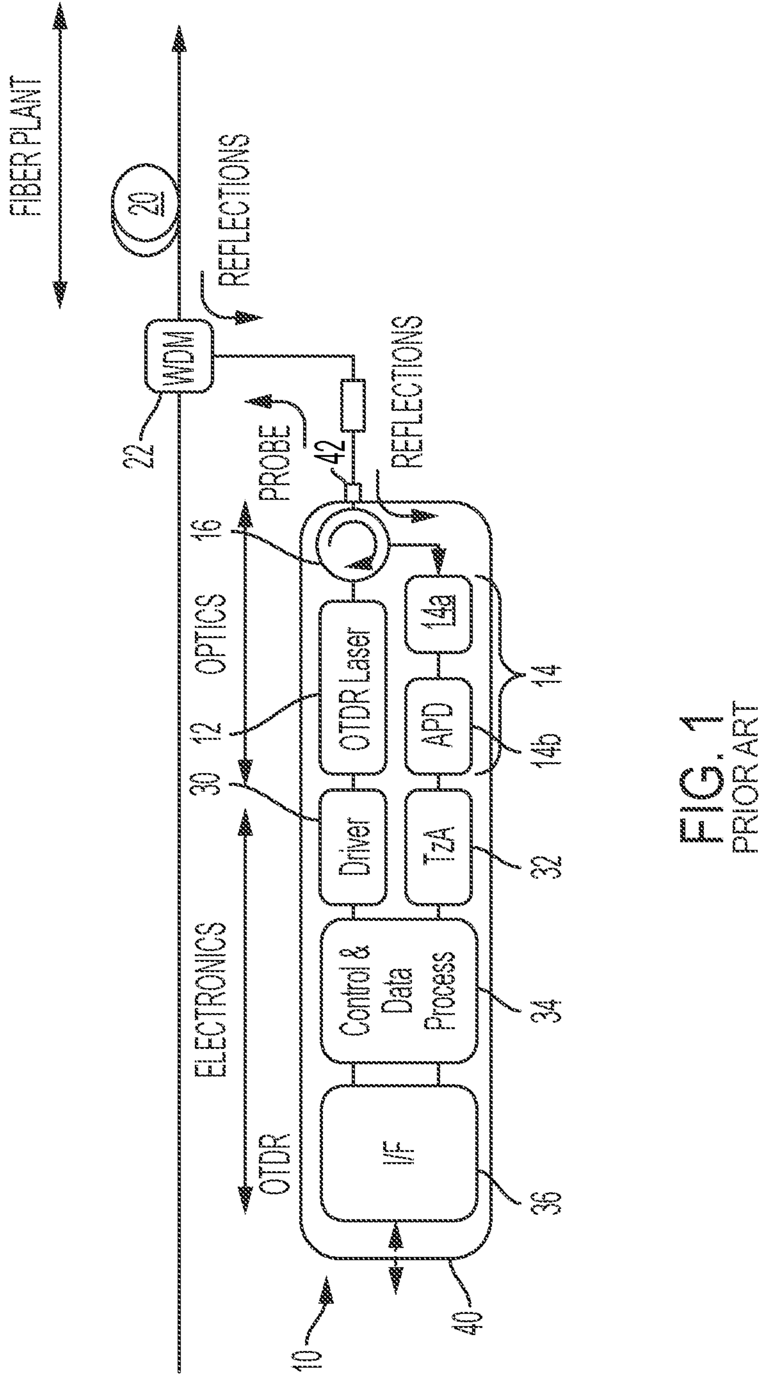
FIG. 1 is a diagram of a conventional prior art OTDR.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments of the disclosed subject matter. Hence, specific dimensions and other physical characteristics related to the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Fiber-optic communication may refer to a form of optical communication that involves transmitting information from one place to another by sending pulses of light (e.g., infrared light) through an optical fiber. The light may be used as a form of carrier wave that is modulated to carry the information. Optical fiber may be preferred over electrical cabling in specific situations, such as when high bandwidth, long distance, and/or immunity to electromagnetic interference is required. Fiber-optic communication can transmit voice, video, data, and telemetry through local area networks or across long distances.

Figure 2:
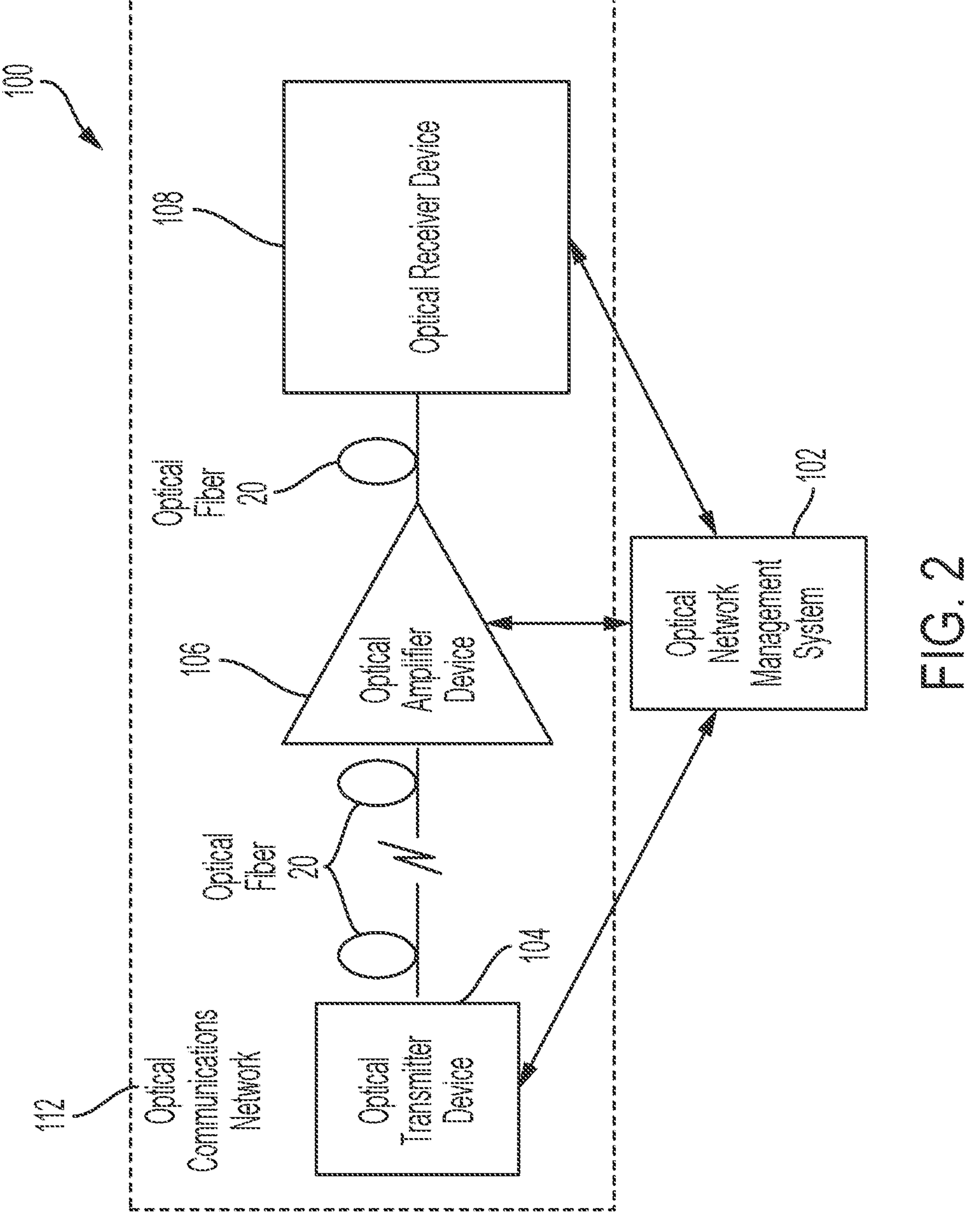
FIG. 2 is a diagram of a non-limiting embodiment of an environment in which systems, described herein, may be implemented according to the presently disclosed subject matter.

Referring now to FIG. 2, FIG. 2 is a diagram of an example environment 100 in which the OTDR system described herein, may be implemented, to monitor the health of the optical fiber spans utilized in such an environment. As shown in FIG. 2, environment 100 may include optical network management system 102, optical transmitter device 104, optical amplifier device 106, and optical receiver device 108. Optical transmitter device 104, optical amplifier device 106, and optical receiver device 108 may be connected via an optical fiber span 20 to form an optical communications network 112. In some non-limiting embodiments, optical network management system 102, optical transmitter device 104, optical amplifier device 106, and optical receiver device 108 may interconnect (e.g., establish a connection to communicate) via wired connections, wireless connections, or a combination of wired and wireless connections.

Optical network management system 102 may include one or more devices configured to communicate with optical transmitter device 104, optical amplifier device 106, and/or optical receiver device 108, and to monitor and control operation of components of an optical communications network. For example, optical network management system 102 may include a circuit, a controller, a processing device, a computing device, (e.g., a server, a group of servers, etc.) and/or other like devices. Additionally or alternatively, optical network management system 102 may include an optical channel monitor (OCM) (e.g., a fast OCM, an OCM sensing device, etc.) and/or other components of an optical communications network. In some non-limiting embodiments, optical network management system 102 may be in communication with a data storage device, which may be local or remote to optical network management system 102. In some non-limiting embodiments, optical network management system 102 may be capable of receiving information from, storing information in, transmitting information to, and/or searching information stored in the data storage device.

Optical transmitter device 104 may include one or more devices configured to transmit an optical signal (e.g., use an electrical signal to modulate the power of a light source) on an optical communications network. For example, optical transmitter device 104 may include an optical transmitter, an optical transceiver (e.g., an optical and electrical transceiver), and/or other like devices. Additionally or alternatively, optical network management system 102 may include a semiconductor device, such as a photodiode (e.g., a light-sensitive semiconductor diode), a light-emitting diode (LED), a laser diode, and/or the like. In some non-limiting embodiments, optical transmitter device 104 may include one or more devices configured to communicate with optical network management system 102.

Optical amplifier device 106 may include one or more devices configured to amplify (e.g., amplify directly, without conversion to an electrical signal) an optical signal on an optical communications network. For example, optical amplifier device 106 may include an optical amplifier (e.g., an erbium doped fiber amplifiers (EDFA)), a repeater (e.g., an optical repeater, an optoelectronic repeater, etc.), and/or other like devices. In some non-limiting embodiments, optical amplifier device 106 may include one or more devices configured to communicate with optical network management system 102.

Optical receiver device 108 may include one or more devices configured to receive an optical signal on an optical communications network. For example, optical receiver device 108 may include an optical receiver (e.g., a coherent optical receiver), a photodetector, and/or other like devices. In some non-limiting embodiments, optical receiver device 108 may include one or more devices configured to communicate with optical network management system 102.

Figure 3:
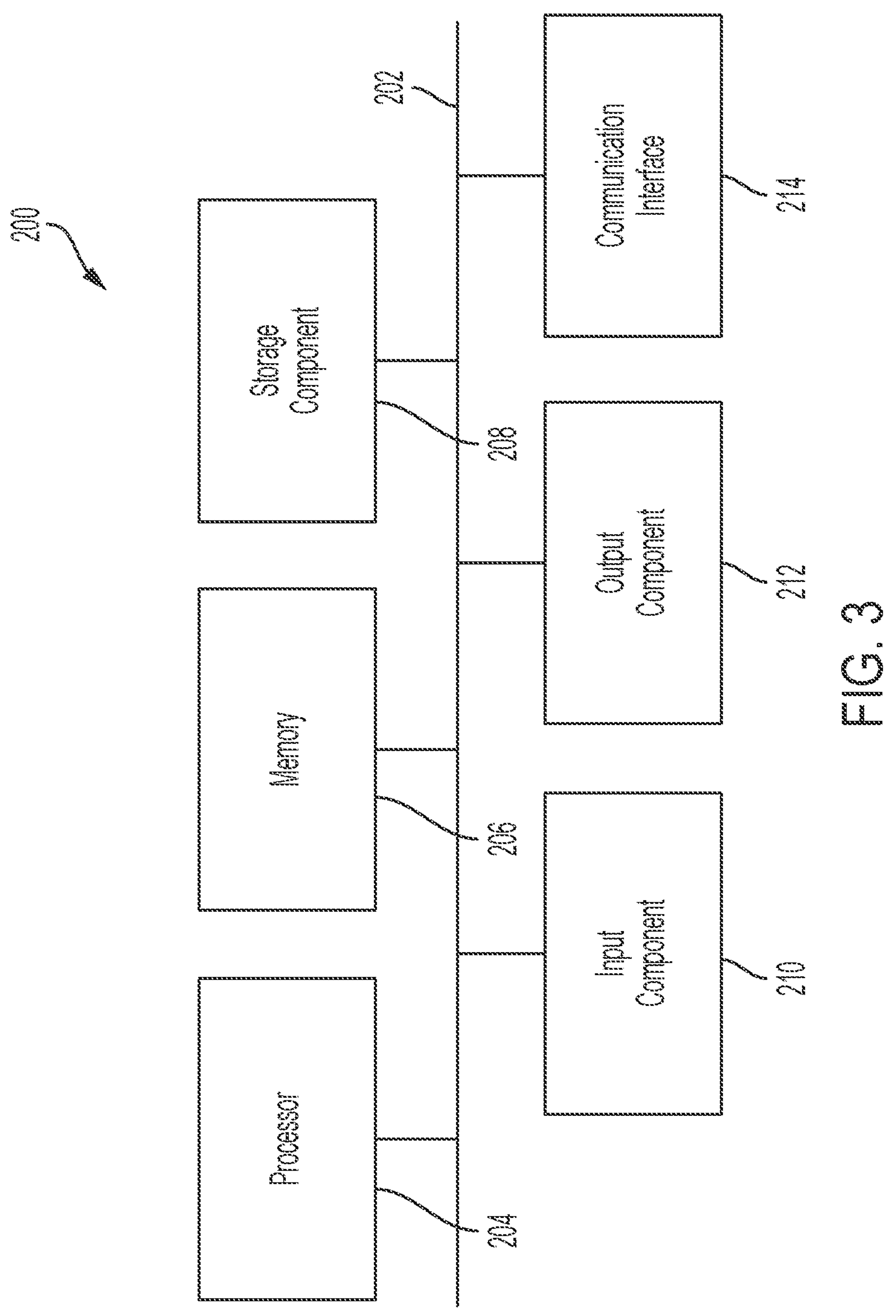
FIG. 3 is a diagram of a non-limiting embodiment of components of one or more devices of FIG. 2.

Referring now to FIG. 3, FIG. 3 is a diagram of example components of a device 200. Device 200 may correspond to optical network management system 102 (e.g., one or more devices of optical network management system 102), optical transmitter device 104, optical amplifier device 106, and/or optical receiver device 108. In some non-limiting embodiments, optical network management system 102, optical transmitter device 104, optical amplifier device 106, and/or optical receiver device 108 may include at least one device 200 and/or at least one component of device 200. As shown in FIG. 3, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), a device configured to implement logic functions, etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 200 may include additional components, fewer components, different components, or differently arranged components than those shown in FIG. 3. Additionally or alternatively, a set of components (e.g., one or more components) of device 200 may perform one or more functions described as being performed by another set of components of device 200.

One device used to monitor the health of the optical fiber spans 20 of the optical communications network 112 is an OTDR. An OTDR is used to detect optical fiber anomalies. An OTDR injects an OTDR signal into the optical fiber span 20 and captures and analyzes the "returns" produced as that signal propagates through the channel. Such returns are produced by scattering of light along the entire length of the fiber and, in some cases, by localized reflections at particular points along the fiber. At an anomaly, such as a degraded splice, more attenuation may occur as light passes through the splice, and in some cases more light may be reflected at this point than at other points that are free of anomalies. The OTDR measures the light returned from points along the length of the fiber to detect anomalies in the fiber system.

Figure 4:
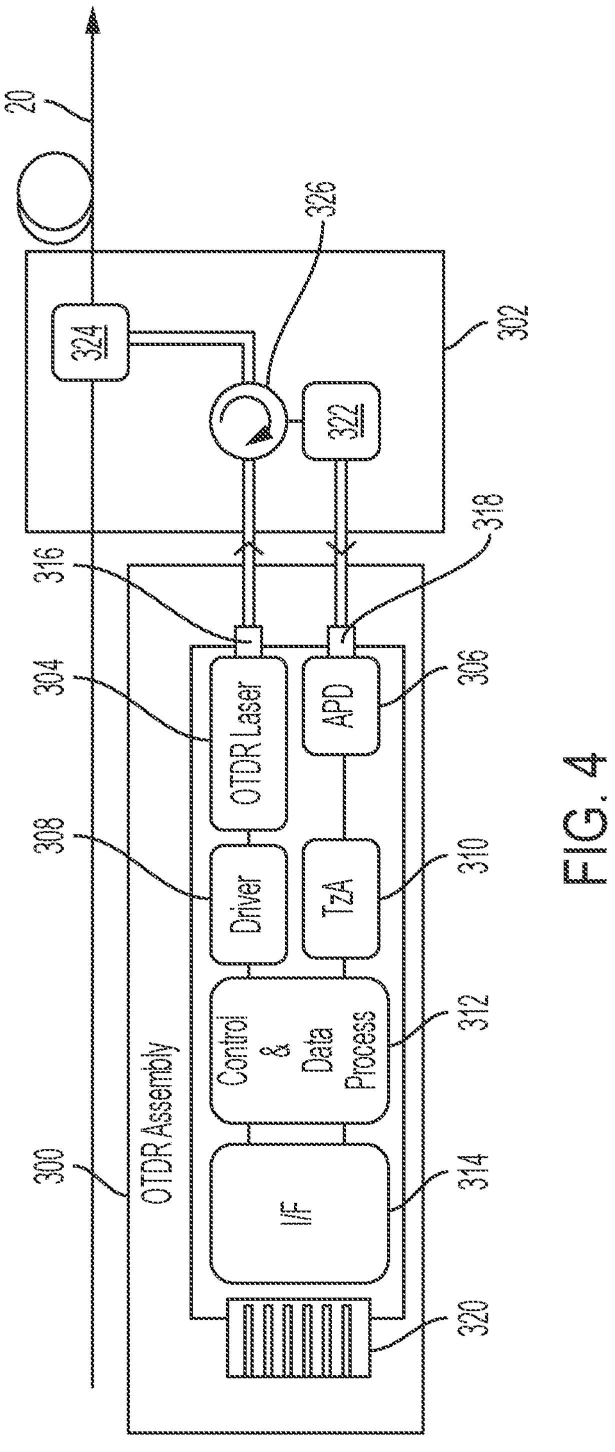
FIG. 4 is a diagram of a non-limiting embodiment of a circulator cable in accordance with the present disclosure connected to a pluggable OTDR and an optic fiber span.

Referring now to FIG. 4, FIG. 4 is a diagram of a pluggable OTDR assembly 300 having a circulator cable 302 in accordance with a non-limiting embodiment of the present disclosure. The use of such a circulator cable 302 allows the OTDR to be utilized as a pluggable component by separating the passive optical components (i.e., the circulator and bandpass filter) from the remaining components of the OTDR. The OTDR assembly 300 is shown as housing the active components such as the electro-optic elements including laser 304 and photodetector 306, as well as electrical components such as a laser driver circuit 308, transimpedance amplifier 310, processor 312, and interface 314.

The laser 304 provides an optical probe lightwave that is coupled into optical fiber span 20 and used in a manner well-understood in the art to create back-reflected light in the return direction, where the reflected light is used to generate an OTDR trace as the output from the OTDR assembly 300. In many cases, the optical probe signal takes the form of an optical pulse train, but other types of optical probe signals (e.g., continuous-wave signal, a digital signal having a particular coding scheme, etc.) may be used as well.

The photodetector 306, such as, but not limited to an avalanche photodetector (APD), is used to measure the back-reflected light created by the optical probe signal as it propagates along the optical fiber span 20.

The electronic elements are used to control the operation of laser 304 and photodetector 306, as well as process the return light from photodetector 306 to develop the OTDR trace output. In particular, the driver circuit 308 is used to energize laser 304, and may be configured to provide a pulsed electronic input to the laser 304. The transimpedance amplifier 310 is coupled to the output from the photodetector 306 and is used to convert the electrical current from the photodetector 306 into a voltage waveform useful in further processing. The processor 306 is used to control operation of laser driver 308 and also analyze the return electrical signals from transimpedance amplifier 310 used to create the OTDR trace.

A pair of optical ports are included with the OTDR assembly 300, shown as an output port 316 coupled to laser 304 and an input port 318 coupled to photodetector 306. The appearance and use of such a dual-port assembly is common to various SFP optical transceiver designs and enhances the capability to configure the OTDR assembly 300 as a pluggable arrangement. An electrical interface connection 320 may take the form of a standard connector used with pluggable optical components.

The circulator cable 302 is used to control/direct the signal flows between the laser 304, the photodetector 306, and the optical fiber span 20. The circulator cable 302, in one non-limiting embodiment, may comprise a bandpass optical filter 322 configured to be coupled to the optical input port 318 of the OTDR assembly 300, a wavelength division multiplexer (WDM) 324 coupled to the optical fiber span 20 under test; and a directional optical coupling device 326 coupled to the bandpass optical filter 322 and the optical output port 316 of the OTDR assembly 300. The WDM 324 makes it possible to take the OTDR measurements at a particular wavelength while the optical communications network 112 is carrying data at another wavelength. The directional optical coupling device 326, which may be embodied as an optical circulator, is configured to direct propagation of the optical probe signal generated by the laser 304 from the optical output port 316 toward the WDM 324 and the optical fiber span 20 under test and direct reflections attributed to the optical probe signal from the optical fiber span 20 under test into the bandpass pass optical filter 322 and then to the optical input port 318.

Figure 5:
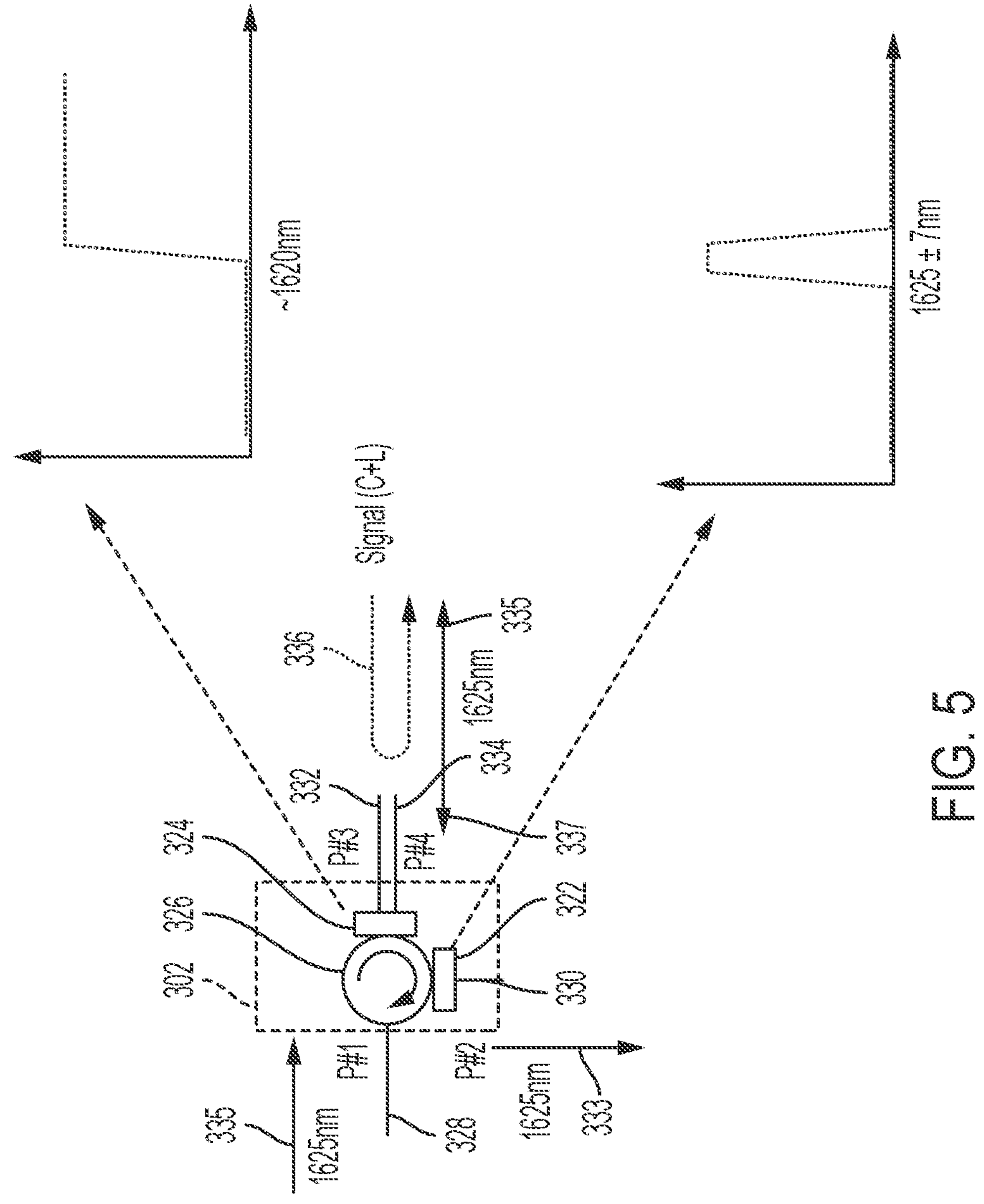
FIG. 5 is a schematic diagram of the circulator cable of FIG. 4.

More specifically, and with reference to FIG. 5, FIG. 5 shows a schematic diagram of the circulator cable 302. The circulator cable 302 may be configured to include four ports 328, 330, 332, and 334. The first port 328 is connected to the laser 304 to receive an optical probe signal 335 therefrom. The optical probe signal 335, in one non-limiting embodiment, may have a wavelength of about 1625 nm. The directional optical coupling device 326 outputs the optical probe signal to the fourth port 334, which is connected to the optical fiber span 20 under test, after it passes through the WDM 324. In one non-limiting embodiment, the WDM 324 may be configured as a bandpass filter that allows signals having a wavelength of greater than about 1620 nm to pass therethrough and reflects signals having a wavelength of less than about 1620 nm. Accordingly, data signals from the optical communications network 336 that enter the third port 332 from the optical fiber span 20 are directed by the WDM 324 back to the optical fiber span 20 through the fourth port 334. In addition, the optical probe signal 335 passes through the WDM 324 to the fourth port 334 and into the fiber optic span 20. Reflections 337, which also have a wavelength of about 1625 nm, attributed to the optical probe signal 335 from the optical fiber span 20 under test pass through the WDM 324 from the fourth port 334 and are circulated and output by the directional optical coupling device 326 into the bandpass pass optical filter 322 and then to the optical input port 318. The optical input port 318 is connected to the photodetector 306, which detects reflections 337 for each optical probe signal 335.

Figure 6:
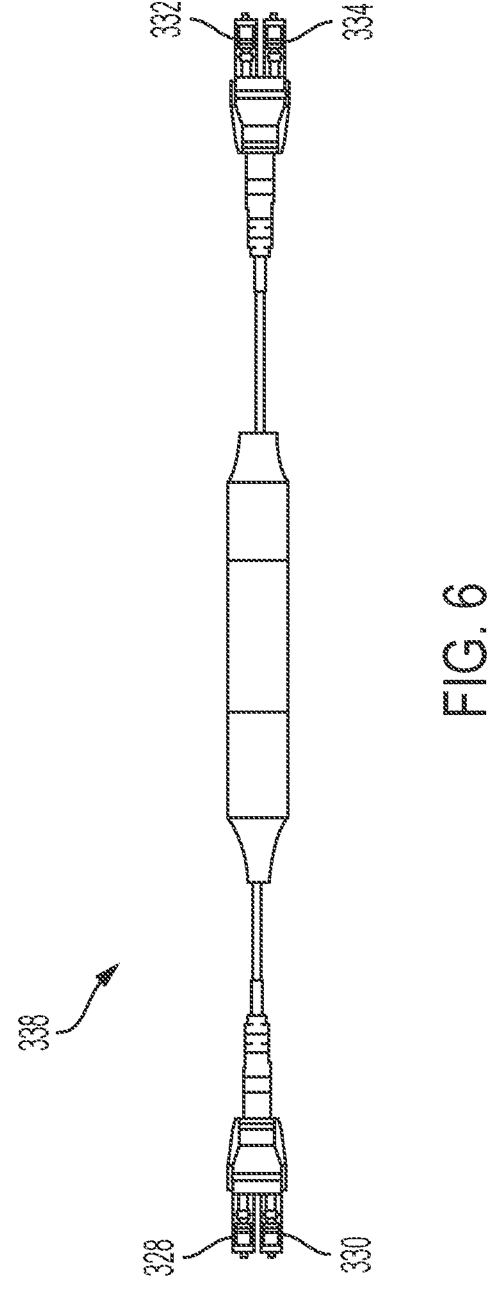
FIG. 6 is a diagram of the circulator cable of FIG. 4 provided in a ruggedized housing.

With reference to FIG. 6, the bandpass optical filter 322, the WDM 324, and the directional optical coupling device 326 may be fitted into a ruggedized cable 338 that may exhibit a 2×2 fiber pigtail configuration. The pair of inputs include the first port 328 connected to the optical output port 316 of the OTDR assembly 300 and the fourth port 334 and the pair of outlets include the third port 332 connected to the fiber span 20 and the second port 330 connected to the optical input port 318 of the OTDR assembly 300. In use, OTDR assembly 300 may simply be "plugged" into the circulator cable 302 and the circulator cable is connected to the fiber optic span 20 via the third port 332 and the fourth port 334. The ports 328, 330, 332, and 334 may comprise angled physical connectors (APCs) as will be discussed hereinafter in greater detail with reference to FIG. 14.

Figure 7:
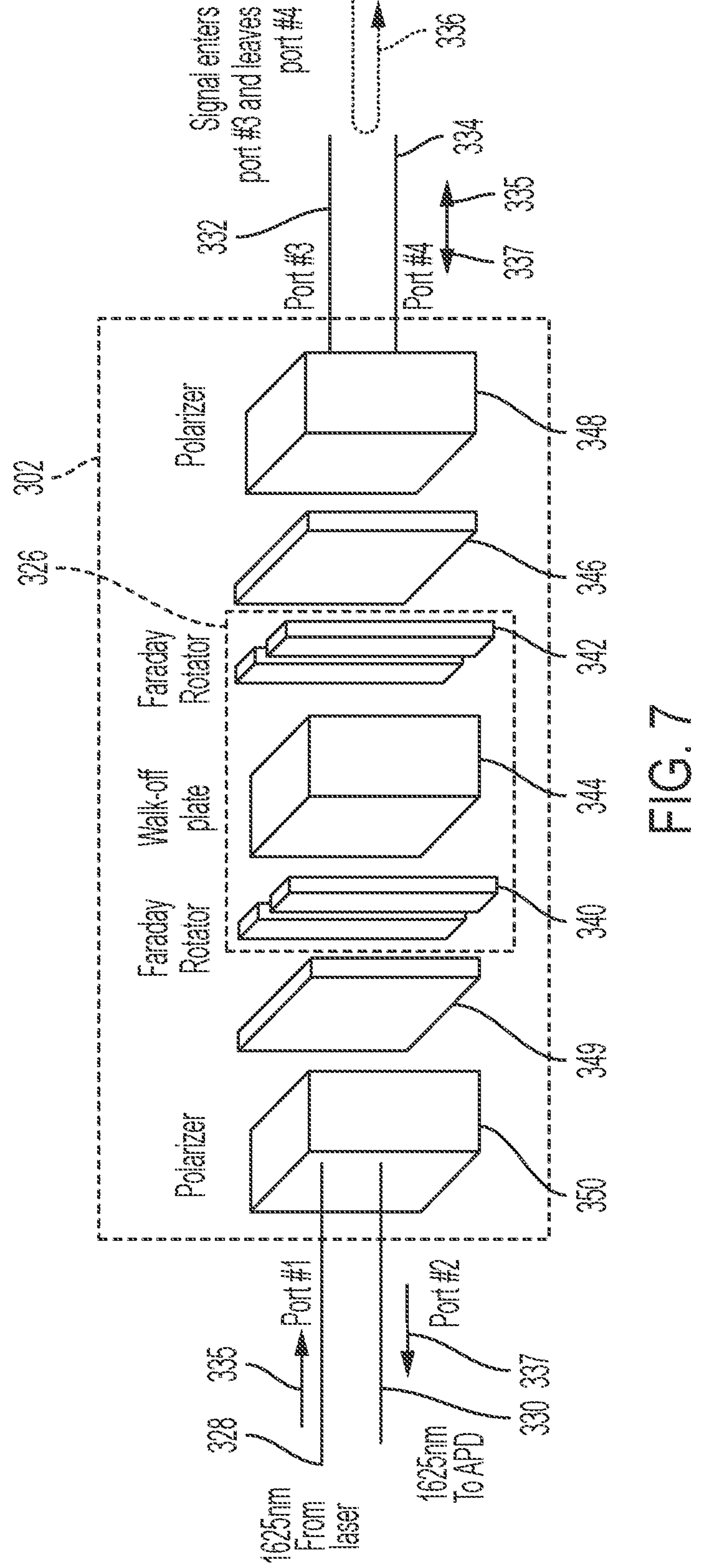
FIG. 7 is a schematic diagram of the circulator cable of FIG. 4 illustrating a first non-limiting embodiment of the components of the circulator cable.

With reference to FIG. 7, a more detailed schematic diagram of the circulator cable 302 is provided. As described hereinabove, the circulator cable 302 may comprise the bandpass optical filter 322 configured to be coupled to the optical input port 318 of the OTDR assembly 300, the WDM 324 coupled to the optical fiber span 20 under test; and the directional optical coupling device 326 coupled to the bandpass optical filter 322 and the optical output port 316 of the OTDR assembly 300. The circulator cable 302 includes four ports 328, 330, 332, and 334. The first port 328 is connected to the laser 304 to receive an optical probe signal 335 therefrom. The directional optical coupling device 326 outputs the optical probe signal to the fourth port 334, which is connected to the optical fiber span 20 under test, after it passes through the WDM 324. The directional optical coupling device 326 may be configured as a first Faraday rotator 340 and a second Faraday rotator 342 separated by a walk-off plate 344 along the optical path. The WDM 324 may be configured as a bandpass filter 346 and a polarizer 348. The bandpass filter 346 may be provided as a separate element or it may be grown directly on a surface of the polarizer 348. The bandpass filter 322 may be configured as a narrow-band filter 349 and a polarizer 350. The narrow-band filter 349 may be provided as a separate element or it may be grown directly on a surface of the polarizer 350.

Figure 8:
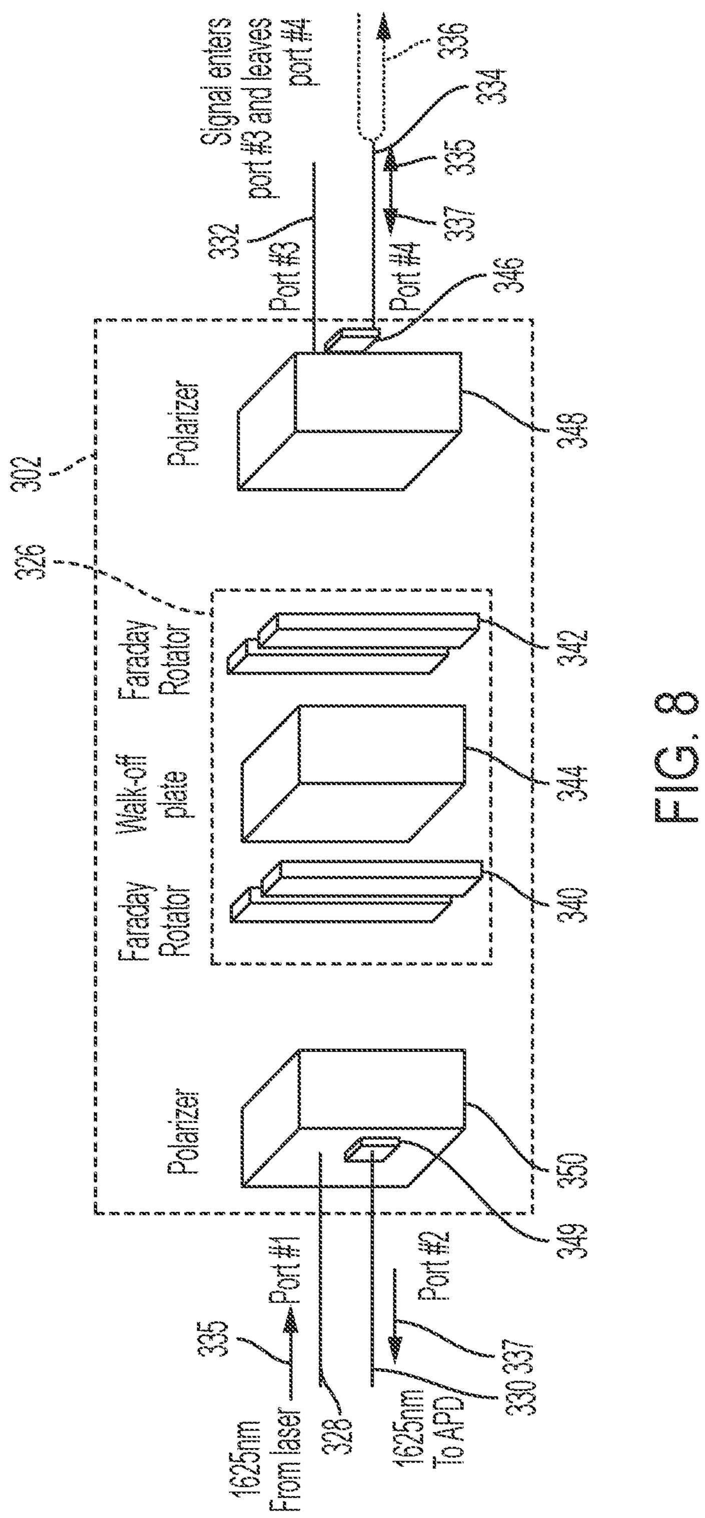
FIG. 8 is a schematic diagram of the circulator cable of FIG. 4 illustrating a second non-limiting embodiment of the components of the circulator cable.

With reference to FIG. 8 another non-limiting embodiment of the circulator cable 302 is schematically illustrated. This non-limiting embodiment is identical to the embodiment illustrated as in FIG. 7 except for the configuration of the narrow-band filter 349 and the bandpass filter 346. More specifically, instead of the providing the narrow-band filter 349 and the bandpass filter 346 as a separate element or growing these filters directly on a surface of the polarizers 348, 350, the narrow-band filter 349 may be grown onto a lens (not shown) of a fiber coupling optic for the first port 328 and the second port 330 and the bandpass filter 346 may be grown onto a lens (not shown) of a fiber coupling optic for the third port 332 and the fourth port 334.

Figure 9:
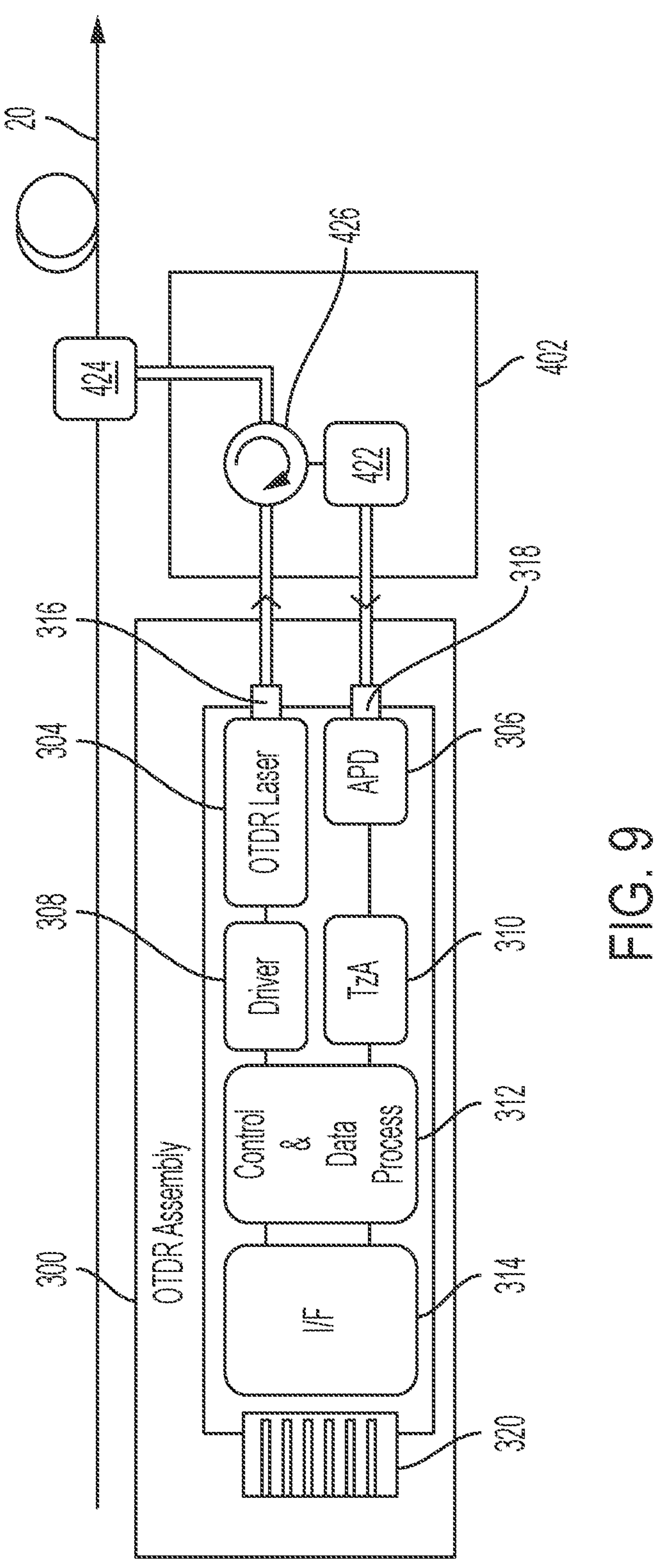
FIG. 9 is a diagram of another non-limiting embodiment of a circulator cable in accordance with the present disclosure connected to a pluggable OTDR and an optic fiber span.

Referring now to FIG. 9, FIG. 9 is a diagram of a pluggable OTDR assembly 300 having a circulator cable 402 in accordance with another non-limiting embodiment of the present disclosure. The use of such a circulator cable 402 also allows the OTDR to be utilized as a pluggable component by separating the passive optical components (i.e., the circulator and bandpass filter) from the remaining components of the OTDR. The OTDR assembly 300 is identical to the OTDR assembly of FIG. 4 and is described in detail hereinabove.

The circulator cable 402 is used to control/direct the signal flows between the laser 304, the photodetector 306, and the optical fiber span 20 via a WDM 424 positioned on the optical fiber span 20. The circulator cable 402, in this non-limiting embodiment, may comprise a bandpass optical filter 422 configured to be coupled to an optical input port 318 of the OTDR assembly 300; and a directional optical coupling device 426 coupled to the bandpass optical filter 422 and the optical output port 316 of the OTDR assembly 300. The directional optical coupling device 426, which may be embodied as an optical circulator, is configured to direct propagation of the optical probe signal generated by the laser 304 from the optical output port 316 toward the WDM 424 provided on the optical fiber span 20 under test and direct reflections attributed to the optical probe signal from the optical fiber span 20 under test into the bandpass pass optical filter 422 and then to the optical input port 318.

Figure 10:
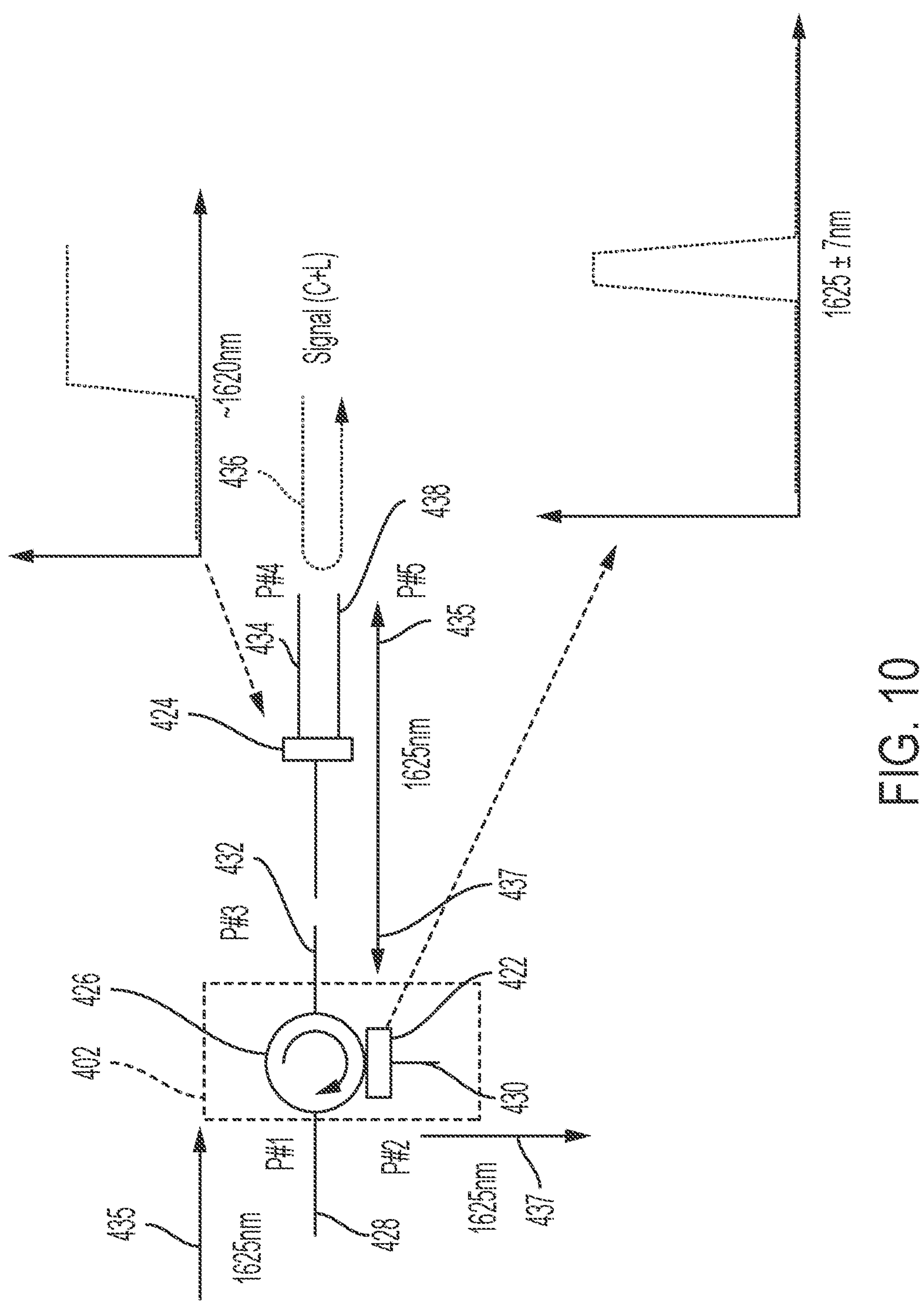
FIG. 10 is a schematic diagram of the circulator cable of FIG. 9.

More specifically, and with reference to FIG. 10, FIG. 10 shows a schematic diagram of the circulator cable 402. The circulator cable 402 may be configured to include three ports 428, 430, 432. The first port 428 is connected to the laser 304 to receive an optical probe signal 435 therefrom. The optical probe signal 435, in one non-limiting embodiment, may have a wavelength of about 1625 nm. The directional optical coupling device 426 outputs the optical probe signal to the third port 432, which is connected to the WDM 424. In one non-limiting embodiment, the WDM 424 includes a fourth port 434 and a fifth port 438 and may be configured as a bandpass filter that allows signals having a wavelength of greater than about 1620 nm to pass therethrough and reflects signals having a wavelength of less than about 1620 nm. Accordingly, data signals from the optical communications network 436 that enter the fourth port 434 from the optical fiber span 20 are directed by the WDM 424 back to the optical fiber span 20 through the fifth port 438. In addition, the optical probe signal 435 passes from the third port 432 of the circulator cable 402 through the WDM 424 to the fifth port 438 and into the fiber optic span 20. Reflections 437, which also have a wavelength of about 1625 nm, attributed to the optical probe signal 435 from the optical fiber span 20 under test pass through the WDM 424 from the fourth port 434 to the third port 432 of the circulator cable 402 and are circulated and output by the directional optical coupling device 426 into the bandpass pass optical filter 422 and then to the optical input port 318 of the OTDR assembly 300. The optical input port 318 is connected to the photodetector 306, which detects reflections 437 for each optical probe signal 435.

Figures 11A, 11B:
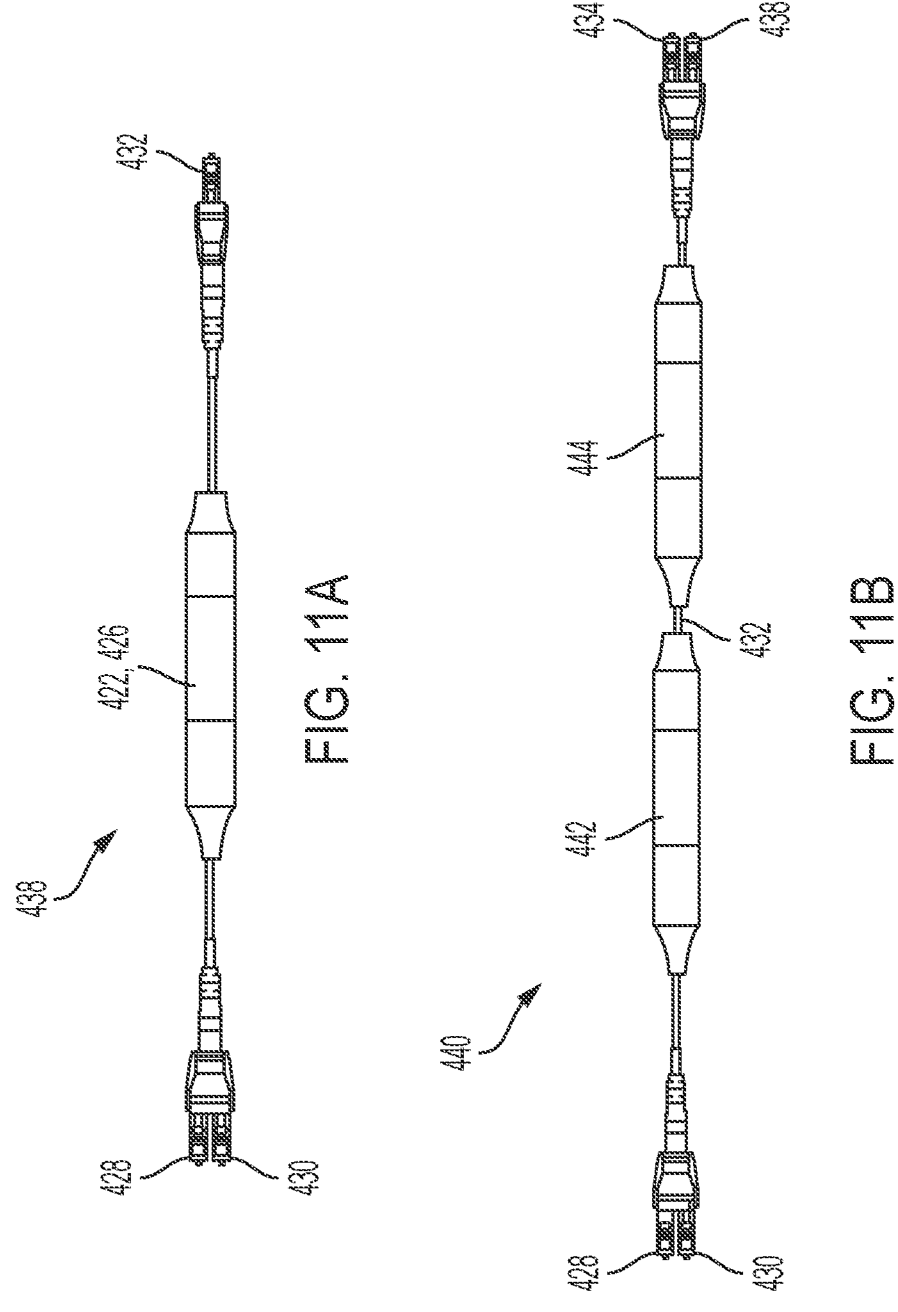
FIGS. 11A and 11B are diagrams of the circulator cable of FIG. 9 provided in a ruggedized housing.

With reference to FIG. 11A, the bandpass optical filter 422 and the directional optical coupling device 426 may be fitted into a ruggedized cable 438 that may exhibit a 1×2 fiber pigtail configuration. The input includes the first port 428 connected to the optical output port 316 of the OTDR assembly 300 and the pair of outlets include the third port 432 connected to the WDM 424 and the second port 430 connected to the optical input port 318 of the OTDR assembly 300. In use, OTDR assembly 300 may simply be "plugged" into the circulator cable 402 and the circulator cable is connected to WDM 424 provided on the fiber optic span 20 via the third port 432. The ports 428, 430, 432 may comprise angled physical connectors (APCs) as will be discussed hereinafter in greater detail with reference to FIG. 14.

With reference to FIG. 11B, an alternative configuration of a ruggedized cable 440 is illustrated in which the bandpass optical filter 422 and the directional optical coupling device 426 are fitted into a first portion 442 of the ruggedized cable 440 and the WDM 424 may be fitted into a second portion 444 of the ruggedized cable 440. Accordingly, the ruggedized cable 440 may exhibit a 2×2 fiber pigtail configuration. The inputs include the first port 428 connected to the optical output port 316 of the OTDR assembly 300 and the fourth port 434 connected to the fiber span 20 and the pair of outlets include the fifth port 438 connected to the WDM 424 and the second port 430 connected to the optical input port 318 of the OTDR assembly 300. The third port 432 may be provided in a second of cable between the first portion 442 and the second portion 444. In use, OTDR assembly 300 may simply be "plugged" into the circulator cable 402 and the circulator cable is connected to the fiber optic span 20 via the fourth port 434 and fifth port 438. The ports 428, 430, 432, 434, and 438 may comprise angled physical connectors (APCs) as will be discussed hereinafter in greater detail with reference to FIG. 14.

Figure 12:
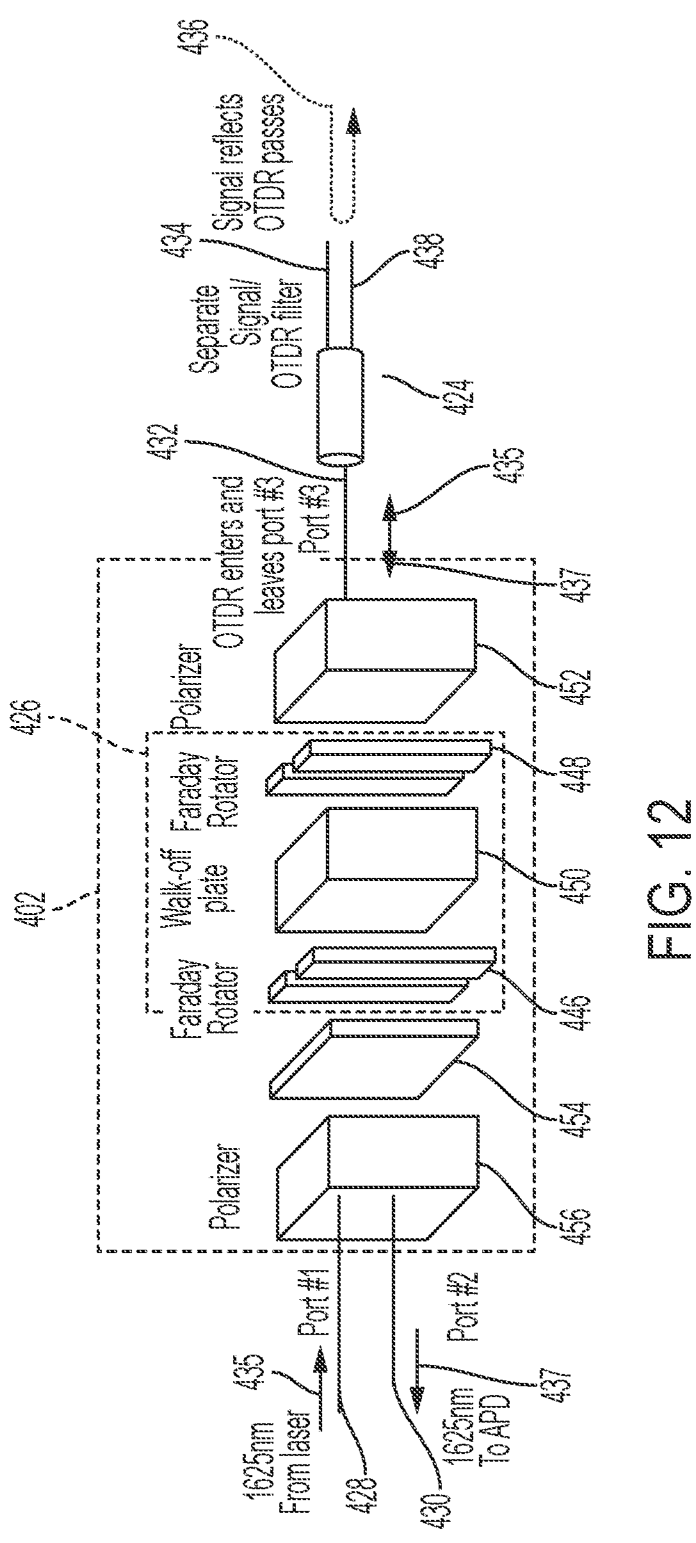
FIG. 12 is a schematic diagram of the circulator cable of FIG. 9 illustrating a first non-limiting embodiment of the components of the circulator cable.

With reference to FIG. 12, a more detailed schematic diagram of the circulator cable 402 is provided. As described hereinabove, the circulator cable 402 may comprise the bandpass optical filter 422 configured to be coupled to the optical input port 318 of the OTDR assembly 300 and the directional optical coupling device 426 coupled to the bandpass optical filter 422 and the optical output port 316 of the OTDR assembly 300. The circulator cable 402 includes three ports 428, 430, and 432. The first port 428 is connected to the laser 304 to receive an optical probe signal 435 therefrom. The directional optical coupling device 426 outputs the optical probe signal to the third port 432, which is connected to the WDM 424. The directional optical coupling device 426 may be configured as a first Faraday rotator 446 and a second Faraday rotator 448 separated by a walk-off plate 450 along the optical path. The third port 432 is coupled to the output of the directional optical coupling device 426 and may be preceded by a polarizer 452. The third port 432 is also coupled to the WDM 424 and may be configured as a bandpass filter. The bandpass filter 422 may be configured as a narrow-band filter 454 and a polarizer 456. The narrow-band filter 454 may be provided as a separate element or it may be grown directly on a surface of the polarizer 456.

Figure 13:
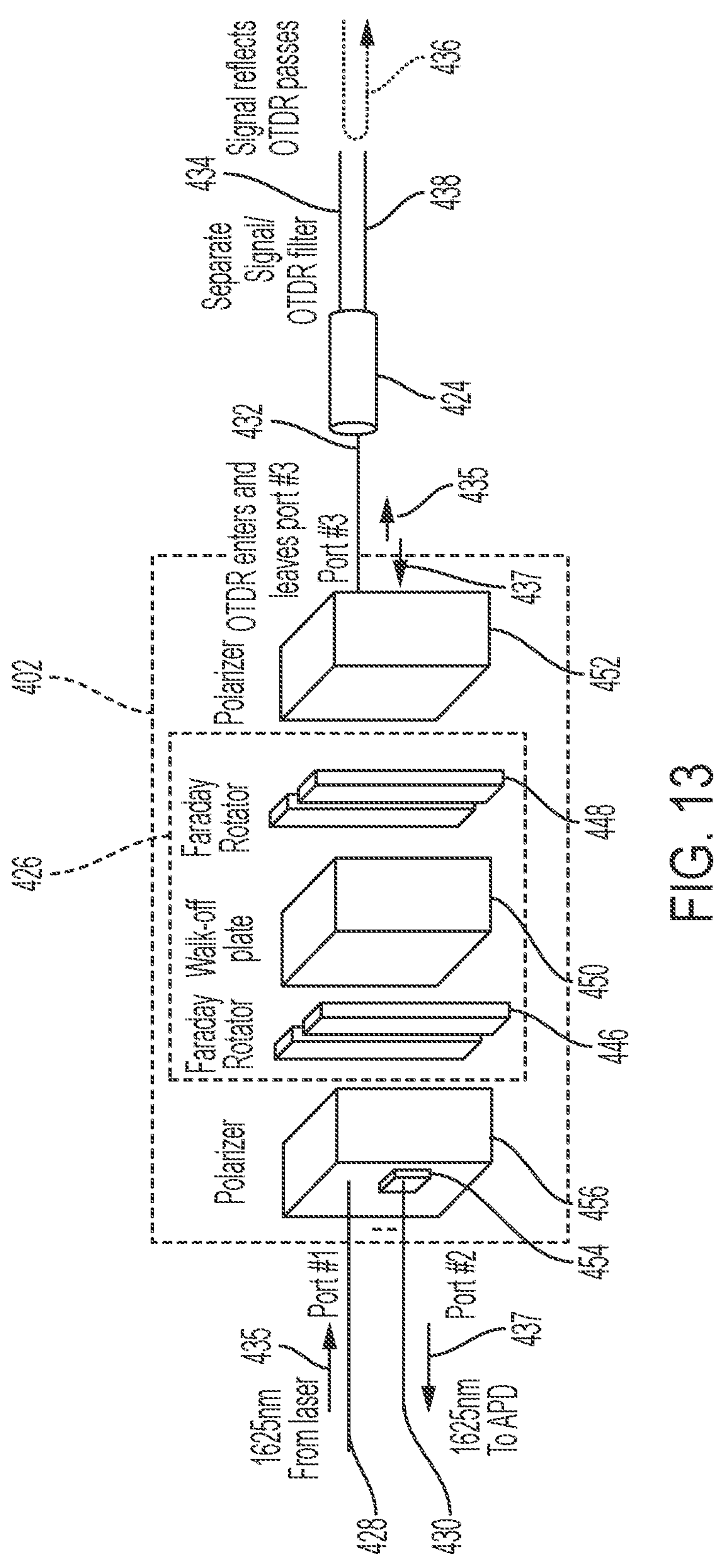
FIG. 13 is a schematic diagram of the circulator cable of FIG. 9 illustrating a second non-limiting embodiment of the components of the circulator cable.

With reference to FIG. 13 another non-limiting embodiment of the circulator cable 402 is schematically illustrated. This non-limiting embodiment is identical to the embodiment illustrated as in FIG. 12 except for the configuration of the narrow-band filter 454. More specifically, instead of providing the narrow-band filter 454 as a separate element or growing this filter directly on a surface of the polarizers 456, the narrow-band filter 454 may be grown onto a lens (not shown) of a fiber coupling optic for the first port 428 and the second port 430.

While configurations of the circulator cable have been described hereinabove that include the bandpass filter, the WDM, and the directional optical coupling device provided within the cable and with the bandpass filter and the directional optical coupling device provided within the cable, this is not to be construed as limiting the present invention as other configurations are possible. For instance, the WDM and the directional optical coupling device may be provided within the cable and the bandpass filter may be provided as a separate component. For example, the bandpass filter may be grown onto a lens of a fiber coupling optic as described hereinabove.

Figure 14:
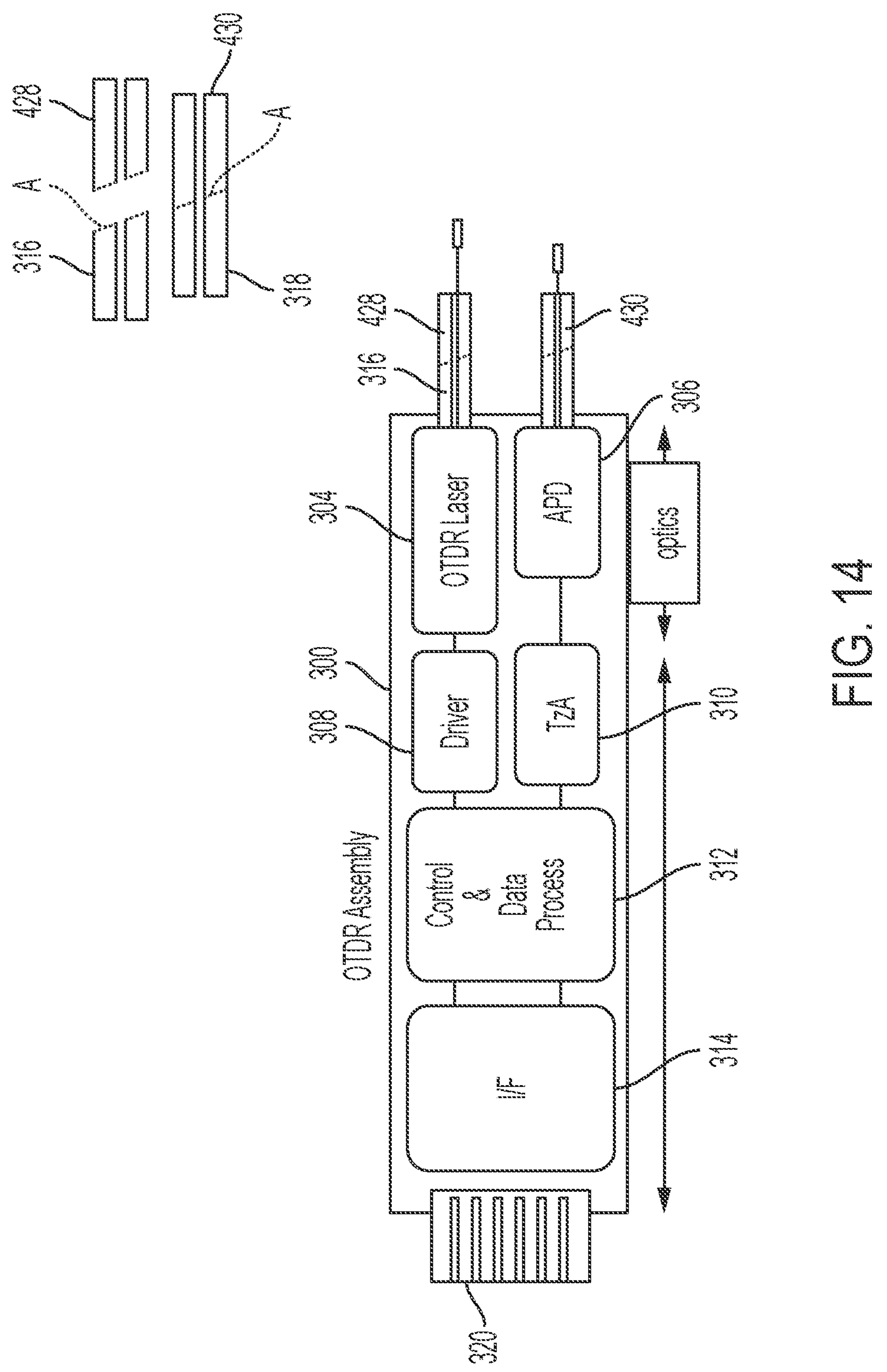
FIG. 14 depicts a particular configuration of the pluggable OTDR shown in FIG. 4 utilizing angled physical connectors (APCs) for the optical ports.

FIG. 14 illustrates a specific configuration of pluggable OTDR 300, where in this case optical ports 316, 318 comprise a pair of angled physical connectors (APCs) configured to mate with APCs provided on the first and second ports 428, 430 of the circulator cable 402. An enlarged view of an exemplary APC is shown in the inset of FIG. 14. While not commonly used in optical communication assemblies, APCs are known to minimize unwanted reflections (associated with the beveled angle A between the fiber endfaces within the connector). For the purposes of this disclosure, the APCs prevent back-reflections from entering laser 304 (on the output path) or fiber span 20 (on the input path).

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A circulator cable configured to couple an optical time domain reflectometer (OTDR) to an optical fiber span under test, the circulator cable comprising:

a ruggedized cable comprising a first port, a second port, a third port configured to be connected to the optical fiber span, and a fourth port configured to be connected to the optical fiber span;

a bandpass optical filter positioned within the ruggedized cable and configured to be coupled to an optical input port of the OTDR via the second port; and a directional optical coupling device positioned within the ruggedized cable and coupled to the bandpass optical filter, the directional optical coupling device further coupled to an optical output port of the OTDR via the first port and configured to direct propagation of an optical probe signal generated by the OTDR from the optical output port toward the optical fiber span under test via the fourth port and direct reflections attributed to the optical probe signal from the optical fiber span under test into the bandpass optical filter via the fourth port.

2. The circulator cable of claim 1, wherein the directional optical coupling device comprises an optical circulator.

3. The circulator cable of claim 2, wherein the optical circulator comprises at least one Faraday rotator.

4. The circulator cable of claim 2, wherein the optical circulator comprises a first Faraday rotator, a second Faraday rotator, and a polarizer positioned between the first Faraday rotator and the second Faraday rotator.

5. The circulator cable of claim 1, wherein the bandpass optical filter is a 1625 nm narrow-band optical filter.

6. The circulator cable of claim 1, wherein the circulator cable further comprises a wavelength division multiplexer positioned within the ruggedized cable for coupling optical signals between the directional optical coupling device and the optical fiber span under test.

7. The circulator cable of claim 1, wherein the first port, second port, third port, and fourth port of the ruggedized cable of the circulator cable are angled physical connectors (APCs).

8. A circulator cable configured to couple an optical time domain reflectometer (OTDR) to an optical fiber span under test, the circulator cable comprising:

a ruggedized cable having a 2×2 fiber pigtail configuration comprising a first port, a second port, a third port configured to be connected to the optical fiber span, and a fourth port configured to be connected to the optical fiber span;

a wavelength division multiplexer positioned within the ruggedized cable and coupled to the optical fiber span under test via the third port and the fourth port; and a directional optical coupling device positioned within the ruggedized cable and coupled to an optical output port of the OTDR, the directional optical coupling device configured to direct propagation of an optical probe signal generated by the OTDR from the optical output port toward the wavelength division multiplexer via the first port and direct reflections attributed to the optical probe signal from the optical fiber span under test into an optical input port of the OTDR via the third port.

9. The circulator cable of claim 8, wherein the directional optical coupling device comprises an optical circulator.

10. The circulator cable of claim 9, wherein the optical circulator comprises at least one Faraday rotator.

11. The circulator cable of claim 9, wherein the optical circulator comprises a first Faraday rotator, a second Faraday rotator, and a polarizer positioned between the first Faraday rotator and the second Faraday rotator.

12. The circulator cable of claim 8 further comprising a bandpass optical filter positioned within the ruggedized cable and configured to be coupled between the directional optical coupling device and the optical input port of the OTDR.

13. The circulator cable of claim 12, wherein the bandpass optical filter is a 1625 nm narrow-band optical filter.

14. The circulator cable of claim 8, wherein the first port, second port, third port, and fourth port of the ruggedized cable of the circulator cable are angled physical connectors (APCs).

15. A circulator cable configured to couple an optical time domain reflectometer (OTDR) to an optical fiber span under test, the circulator cable comprising:

a ruggedized cable having a 2×2 fiber pigtail configuration comprising a first port, a second port, a third port configured to be connected to the optical fiber span, and a fourth port configured to be connected to the optical fiber span;

a bandpass optical filter positioned within the ruggedized cable and configured to be coupled to an optical input port of the OTDR via the second port;

a wavelength division multiplexer configured to be positioned within the ruggedized cable and coupled to the optical fiber span under test via the third port and the fourth port; and a directional optical coupling device positioned within the ruggedized cable and coupled to the bandpass optical filter, the directional optical coupling device further coupled to an optical output port of the OTDR via the first port and configured to direct propagation of an optical probe signal generated by the OTDR from the optical output port via the first port toward the wavelength division multiplexer and the optical fiber span under test via the fourth port and direct reflections attributed to the optical probe signal from the optical fiber span under test into the bandpass optical filter via the fourth port.

16. The circulator cable of claim 15, wherein the directional optical coupling device comprises an optical circulator.

17. The circulator cable of claim 15, wherein the bandpass optical filter, the wavelength division multiplexer, and the directional optical coupling are fitted into a ruggedized cable.

18. The circulator cable of claim 15, wherein the first port, second port, third port, and fourth port of the ruggedized cable of the circulator cable are angled physical connectors (APCs).

* * * * *